(12) United States Patent
Gutierrez et al.

(10) Patent No.: US 6,785,031 B1
(45) Date of Patent: Aug. 31, 2004

(54) SNAP DOWN PIVOTING OPTICAL ELEMENT

(75) Inventors: Roman C. Gutierrez, La Crescenta, CA (US); Tony K. Tang, Glendale, CA (US)

(73) Assignee: SiWave, Inc., Arcadia, CA (US)

( * ) Notice: Subject to any disclaimer, the term of this patent is extended or adjusted under 35 U.S.C. 154(b) by 0 days.

(21) Appl. No.: 10/660,816

(22) Filed: Sep. 12, 2003

Related U.S. Application Data

(62) Division of application No. 09/870,967, filed on May 31, 2001, now Pat. No. 6,621,611.
(60) Provisional application No. 60/208,050, filed on May 31, 2000.

(51) Int. Cl.[7] .............................................. G02B 26/08
(52) U.S. Cl. ........................................ 359/223; 359/225
(58) Field of Search ................................. 359/198, 199, 359/212, 223, 224, 225; 385/16, 17, 18

(56) References Cited

U.S. PATENT DOCUMENTS 5,673,139 A     9/1997  Johnson
6,147,856 A  *  11/2000 Karidis ........................ 361/277

* cited by examiner

*Primary Examiner*—Euncha Cherry
(74) *Attorney, Agent, or Firm*—MacPherson Kwok Chen & Heid LLP

(57) ABSTRACT

A pivotable optical element that may be fully deflected in a plurality of positions is disclosed. The fully deflected positions of the optical element may be defined against linear segments on a platform or against linear segments on the optical element.

2 Claims, 4 Drawing Sheets

SNAP DOWN PIVOTING OPTICAL ELEMENT

RELATED APPLICATIONS

This application is a divisional of U.S. patent application Ser. No. 09/870,967 filed on May 31, 2001 patented U.S. Pat. No. 6,621,611, which claims the benefit of U.S. Provisional Application No. 60/208,050, filed May 31, 2000, the contents of which are incorporated by reference herein.

FIELD OF INVENTION

The invention relates generally to optics, and more particularly to a pivoting element for optical applications.

BACKGROUND

Optical switches have numerous applications for optical networks in areas such as cross-connects. Micro-electromechanical system (MEMS) optical mirrors have been developed for use in such switches. MEMS devices are fabricated using photolithographic techniques similar to those developed for mass production of semiconductor integrated circuits. Through successive deposition of, for example, polysilicon and oxide layers onto a substrate in conjunction with masking and etching steps, a designer may form MEMS devices of myriad shapes and sizes.

In a conventional MEMS optical switch, as seen for example in U.S. Pat. No. 6,044,705, electrostatic forces are used to pivot a suspended mirror in a desired direction. In this manner, the mirror may direct light beams at a desired angle. For accurate optical switching, however, the mirror should be pivoted very precisely so that the desired angle(s) may be achieved repeatedly with high precision. The resulting angle is determined by the balance between the applied electrostatic force and the spring restoring force applied by the mirror's suspension. This balance drifts with variations both in temperature and in stress. To prevent the drift from affecting desired results, complicated feedback circuitry is often necessary to control the direction of the mirror.

To address the need for accurate and repeatable positioning of the mirror for optical switching, U.S. Pat. No. 6,212,309 discloses a suspended rectangular mirror that pivots on its axis in the familiar manner of a playground seesaw. Just as a seesaw's pivoting motions is stopped in the same position when it contacts the ground, the disclosed rectangular mirror will come to rest at the same angle when it is fully deflected against its substrate. Although this mirror advantageously can pivot to an accurate and repeatable direction, it suffers from certain disadvantages. For example, it has only two fully deflected positions, just as does a playground seesaw. Thus, it is limited in the number of angles in which it can direct light when in the fully deflected position.

Accordingly, there is a need in the art for a MEMS pivoting element that can accurately and repeatably position itself in a plurality of directions.

SUMMARY

In accordance with one embodiment of the invention, an optical switch includes an element pivotably mounted on a platform formed on a baseplate. The perimeter of the platform includes a plurality of linear segments. Electrodes are arranged on the platform such that the element may be fully deflected onto the linear segments in response to actuation forces.

In accordance with another embodiment of the invention, an optical switch includes an element pivotably mounted on a baseplate. The perimeter of the element includes a plurality of linear segments. Electrodes are arranged on the baseplate such that the element may fully deflect its linear segments onto the baseplate in response to actuation forces.

BRIEF DESCRIPTION OF THE DRAWINGS

Use of the same or similar reference numbers in different figures indicates the same or like elements.

DETAILED DESCRIPTION

Figure 1:
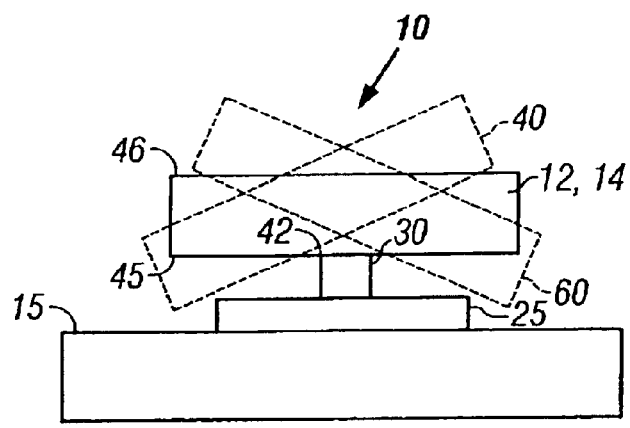
FIG. 1 is a cross sectional view of a pivotable element including a baseplate forming a platform according to one embodiment of the invention.
Figure 2:
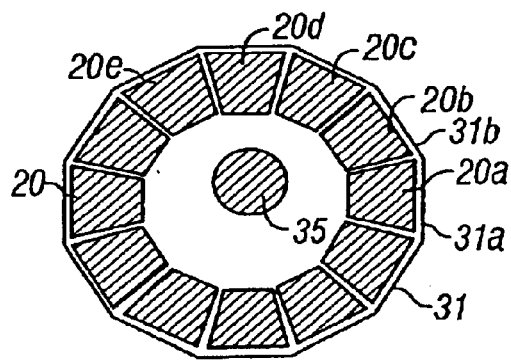
FIG. 2 is a plan view of the baseplate of FIG. 1.

FIG. 1 shows one embodiment of a pivoting element 10 according to the invention. An optical element 12 is suspended above a baseplate 15, allowing the element 12 to respond to electrostatic forces produced by electrodes 20. Baseplate 15 forms a platform 25 having a first surface wherein the electrodes 20 are arrayed. FIG. 2 shows the arrangement of electrodes 20 on the first surface of platform 25. A pillar 30 extends from the platform 25 to the element 12. Because the pillar 30 and optical element 12 may be doped to be electrically conducting, a ground electrode 35 on platform 25 that couples to the pillar 30 also grounds the optical element 12. In this fashion, when, e.g., electrode 20a is given a charge, element 12 will pivot and "snap down" onto the perimeter 31 of the platform 25, assuming a position such as indicated by the dotted line 40 in FIG. 1. In particular, element 12 will pivot and contact linear segment 31a of perimeter 31 when electrode 20a is charged.

When element 12 is snapped down on linear segment 31a, its contact point 42 with the perimeter of pillar 30 and the linear segment 31a define a plane. Because the diameter of the optical element 12 is larger than the diameter of the platform 25, the optical element 12 will overhang the linear segment 31a in this position. In turn, because element 12 may have a planar undersurface 45, that planar undersurface 45 is held in the plane defined by its contact point 42 and the linear segment 31a when element 12 is snapped down on linear segment 31a. Should element 12 be of uniform thickness, its surface 46 is parallel to this plane. It will be appreciated that a non-planar element 12 could also be employed. In such a case, the relationship between the non-planarity and the plane defined by the contact point 42 and the linear segment would have to be accounted for in determining the position of surface 46 when the element 12 is in the snapped down position.

The accuracy and precision of achieving a desired position of surface 46 is thus controlled by the precision of micromachining linear segment 31a as well as the micromachining of the pillar 30 defining contact point 42. Because MEMS technology allows an accurate micromachining of these factors, the desired position of surface 46 may be accurately defined and repeatedly achieved by a user. Advantageously, the lateral position of element 12 with respect to platform 25 does not affect the ability to achieve a desired plane. Moreover, no feedback circuitry is required to maintain this accurate direction. The surface 46 of optical element 12 may be adapted to serve many different optical functions. For example, surface 46 may be metallized to form element 12 into a mirror. Alternatively, surface 46 could receive a grating, multiple dielectric coatings with or without wavelength dependence, or holograms. In addition, active optical elements such as liquid crystals, lasers, detectors, modulators, gain elements may be formed or mounted on surface 46 or combined with other elements. Regardless of how optical element 12 is formed, the present invention provides a plurality of accurately defined and repeatable snap down positions for this element. Thus, although the following description will discuss an optical element 12 having its surface 46 metallized to form a mirror element 14, it will be appreciated that other types of optical elements 12 may be utilized.

As seen in FIG. 2, the perimeter 31 of platform 25 may be formed in a polygon shape, wherein each linear segment 31a, 31b, etc., corresponds to a particular electrode 20. For example, should a charge exist on electrode 20a, mirror element 14 will fully deflect against linear segment 20a. Similarly, should a charge exist on electrode 20b, mirror element 14 will fully deflect against linear segment 20b and so on. In this fashion, the mirror element 14 may fully deflect against each linear segment within perimeter 31 dependent upon whether the corresponding electrode 20 has been energized. To move the mirror element from being fully deflected against any given linear segment to being fully deflected against another linear segment, one need only energize in succession the intervening electrodes and finally the electrode corresponding to the linear segment at the desired location. For example, to move the mirror element 14 from being fully deflected (or snapped down) against linear segment 31a to become fully deflected against linear segment 31d, one may perform the following. First, electrode 20b would be charged and electrode 20a grounded. Then, electrode 20c would be charged and electrode 20b grounded. Next, electrode 20d would be charged and electrode 20c grounded. In this fashion, the mirror element would be fully deflected against linear segments 31a, 31b, 31c, and 31d in succession. The resulting motion of the mirror element 14 is analogous to that of a spinning coin just before it comes to rest or a top rolling about its pivot.

Figure 3:
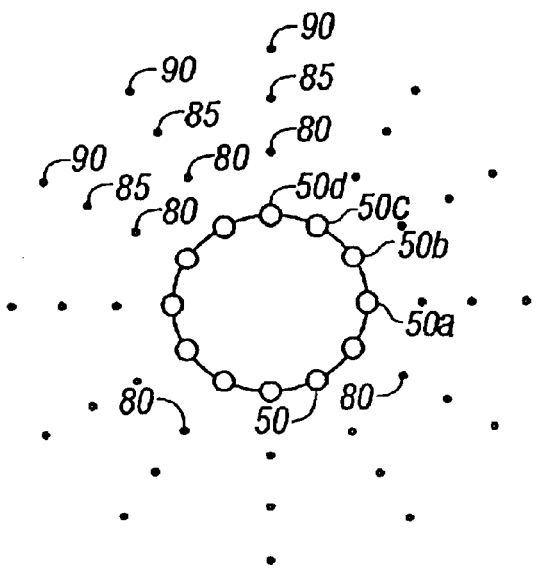
FIG. 3 illustrates reflected light directions provided by an embodiment of the invention wherein the pivotable element forms a mirror and light impinges the mirror element normal to the baseplate.

Assuming a light beam incident onto the center of the reflecting surface 46 and normal to the platform 25, the reflected light beam will thus point to the discrete locations 50 on an imaginary plane that is parallel to the platform 25 as indicated in FIG. 3. For example, if the mirror element is fully deflected against linear segment 20a, the reflected light beam will be incident at location 50a. Similarly, linear segments 20b, 20c, and 20d correspond to locations 50b, 50c, and 50d, respectively. Thus, the mirror element 12 may direct light in a relatively large number of directions arranged in a cone-like fashion as given by polar coordinates. It will be appreciated that the light can be directed in symmetries that are different from a perfect cone, however. For example, should the pivot 30 not be located at the center of mirror element 14, many different symmetries may be swept through as the mirror element 14 deflects through all the linear segments in perimeter 30. In addition, rather than using a symmetric polygon shape for perimeter 30, a non-symmetric polygon shape could be used to affect the directions of the reflected light beams.

Note the advantages provided by present invention. As described above, when switching reflected light directions, the mirror element 14 is always fully deflected against the linear segments of the platform. Thus, the gap between the mirror element 14 and the electrodes 20 is relatively small, making the electrostatic forces relatively large. In turn, this permits the voltage on the electrodes 20 to kept low, e.g., 5 volts or less. Higher voltages may be used, of course, to provide faster motion and added robustness. Moreover, the control of the mirror element 14 is fully digital, corresponding merely to turning on and off the respective electrodes to get the mirror "rolling" in the desired direction. In addition, because the mirror is fully deflected as it operates, any suspension it requires may be very soft. In current state of the art switches, however, the suspension must be relatively hard because it determines the speed at which the mirror comes back to its neutral location. Indeed, it is possible to eliminate the suspension entirely for the present invention because it is not needed to achieve the multiple fully deflected positions, making the spring stiffness irrelevant. However, having a suspension that "preloads" the mirror element by mechanically biasing it normally against the baseplate lowers the effective spring stiffness by providing a destabilizing force that effectively provides a negative spring constant. In this fashion, faster switching times or lower operating voltages may be achieved with respect to embodiments that are not "preloaded."

Figure 4:
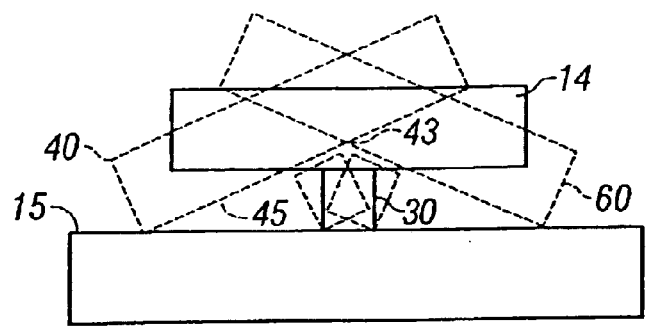
FIG. 4 is a cross-sectional view of a pivotable element wherein the pivot attaches to the pivotable element according to one embodiment of the invention.
Figure 5:
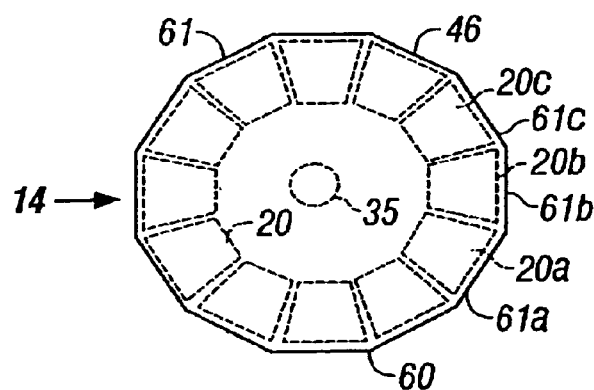
FIG. 5 is a plan view of the pivotable element of FIG. 4, partially cutaway to show the electrodes on the baseplate.

Many other embodiments of the invention are possible that provide the benefits just described. For example, as seen in FIG. 4, the baseplate 15 need not have a platform 25. In such a case, perimeter 60 of the mirror element 14 (rather than the undersurface 45) may deflect against the baseplate. FIG. 5 shows a plan view of the reflecting surface 46 of the mirror element for this embodiment. In this embodiment the perimeter 60 of the mirror element 14 includes linear segments 61. The relative position of the electrodes 20 and the ground electrode 35 on the baseplate 15 to the mirror element 14 are shown by the dotted lines in FIG. 5. It will be appreciated that the relative position of the electrodes 20 is arbitrary. For example, they could extend laterally beyond the perimeter 60 of the mirror element 14. Alternatively, each electrode 20 could be divided into multiple electrodes. Regardless of the positioning of the particular positioning of the electrodes, the movement of mirror element 14 is analogous to that described with respect to FIGS. 1 and 2. For example, should electrode 20a be charged, mirror element 14 will fully deflect against baseplate 15 along linear segment 61a. As seen in FIG. 4, the fully deflected mirror element 14 may take a position such as indicated by the dotted line 40. Referring back to FIG. 5, the fully deflected mirror element 14 may be moved from linear segment to linear segment by successively turning on and off the electrodes. For example, if the mirror element 14 is fully deflected such that linear segment 61a is against the baseplate 15, the mirror element will pivot to rest linear segment 61b against the baseplate 15 when electrode 20a is grounded and electrode 20b is charged. In turn, the mirror element will pivot to rest linear segment 61c against the baseplate 15 when electrode 20b is grounded and electrode 20c is charged, and so on. When the mirror element 14 is fully deflected to rest a given linear segment 61 against the baseplate 15, the linear segment and the pivot point 43 define a plane. Assuming a mirror element 14 of uniform thickness and light incident normally to the baseplate 15, the fully deflected mirror element will reflect light in the direction normal to this plane. Thus, if the pillar 30 is centered within the mirror element 14, the resulting directions of reflected light (assuming a normal incident beam) will be as shown by points 50 in FIG. 3. Alternatively, other symmetries will be followed should the pillar 30 be off center.

It will be appreciated that, regardless of whether the invention incorporates a platform 25, the pillar 30 may be made either integral with the mirror element 14 or integral with the baseplate 15. FIG. 1 illustrates an embodiment in which the pillar 30 is integral with the platform 25 (and hence the baseplate 15). FIG. 4 illustrates an embodiment in which the pillar 30 is integral with the mirror element 14. Note that in this embodiment, the suspension must accommodate a greater lateral motion by the mirror element 14 than in embodiments in which the pillar 30 is not integral with the mirror element 14.

Figure 6:
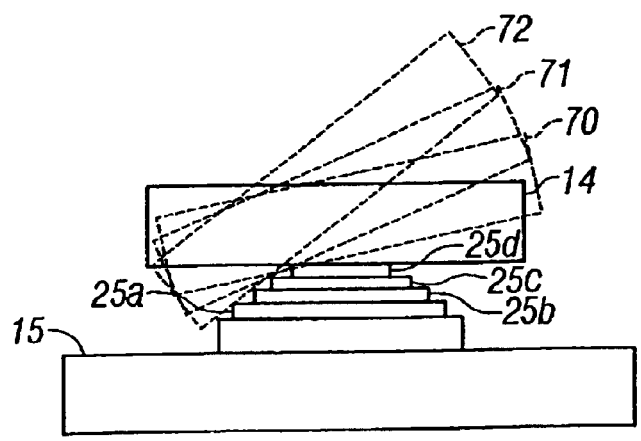
FIG. 6 is a cross-sectional view of an element pivotably mounted on a baseplate forming a plurality of platforms according to one embodiment of the invention.
Figure 7:
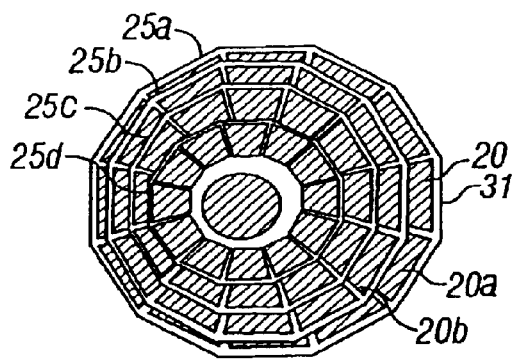
FIG. 7 is a plan view of the plurality of platforms of FIG. 6.

Referring now to FIG. 6, an embodiment with nested platforms 25a, 25b, 25c, and 25d is illustrated. This embodiment provides a range of deflection angles depending upon which platform the mirror element 14 is deflected against. For example, should the mirror element 14 deflect against baseplate 25d, the mirror element may assume the position indicated by the dotted line 70. Alternatively, should the mirror element 14 deflect against baseplate 25c, the mirror element may assume the position indicated by the dotted line 71, and again with respect to baseplate 25b and position 72. FIG. 7 shows a plan view of the stacked platforms 25a–d. Each plate 25a–d has electrodes 20 arranged as discussed with respect to FIG. 2. Thus, depending on which particular electrode is charged, the mirror element 14 will fully deflect onto the corresponding linear segment 31. For movement of the mirror element 14 from linear segment to linear segment within a given platform, the charging and grounding of electrodes 20 is as described with respect to FIG. 3. Thus, should the mirror element 14 be deflected onto platform 25d, the directions a reflected light signal could be directed by mirror element 14 onto an imaginary plane parallel to baseplate 15 may be as shown by points 50 in FIG. 3. Similarly, should the mirror element 14 be deflected on platform 25c, the directions a reflected light signal could be directed by mirror element 14 may be as shown by points 80, and so on for points 85 corresponding to platform 25b and points 90 for platform 25a. Note that the plane assumed by the mirror element 14 is defined by the contact between the mirror and two adjacent surfaces. This may be a linear segment 31 and a point or two linear segments depending upon the clocking of the electrodes and the arrangement of the linear segments on the various platforms.

Figure 8:
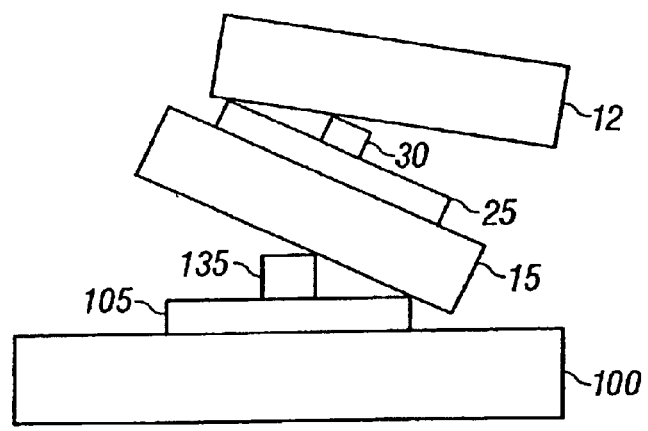
FIG. 8 is a cross-sectional view of an element pivotably mounted on a first baseplate that is pivotably mounted on a second baseplate according to one embodiment of the invention.

By stacking pivoting elements, an even greater flexibility in switching directions may be achieved. For example, FIG. 8 shows the baseplate 15 of FIG. 1 being itself pivotably mounted on a baseplate 100. Analogous to the embodiment of FIG. 1, the baseplate 100 forms a platform 105 and pillar 135. The perimeter of platform 105 would have a plurality of linear segments such as shown in FIG. 2. In addition, the surface of the platform 105 facing baseplate 15 would include the electrodes as shown in FIG. 2. It will be appreciated that the embodiment shown in FIG. 8 may be varied. For example, rather than using platforms 25 and 105, the mirror element 14 and baseplate 15 could be formed as discussed with respect to FIG. 5. Moreover, the pillar 30 may be integral with the mirror element 14 or the platform 25. Similarly, pillar 135 may be integral with the baseplate 15 or the platform 105.

Figure 9:
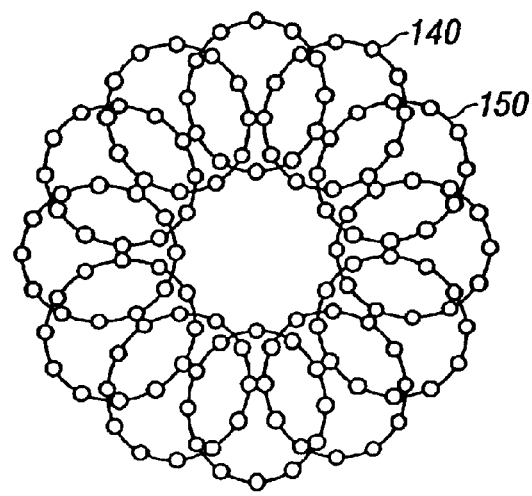
FIG. 9 illustrates reflected light directions provided by an embodiment of the invention as shown in FIG. 8 wherein the pivotable element forms a mirror and light impinges the mirror element normal to the second baseplate.

FIG. 9 shows the resulting reflected light directions 140 provided by the embodiment of the invention illustrated in FIG. 8. Similar to FIG. 3, these positions 140 are those achieved on an imaginary plane parallel to baseplate 100 by the reflections of a light beam incident normal to baseplate 100. Each fully deflected position of substrate 15 onto platform 105 corresponds to a particular cone 150 of light directions. Within a given cone 150, the fully deflected positions of mirror element 14 onto platform 25 provide the directions 140 as discussed with respect to FIG. 3.

Figure 10:
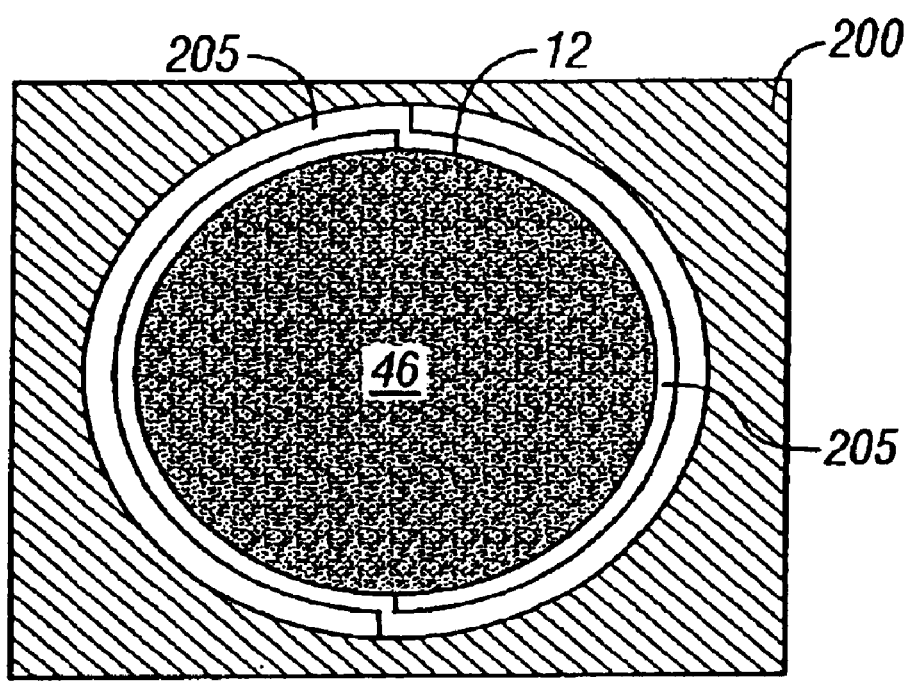
FIG. 10 is a plan view of a wafer formed a mirror element and its suspension according to one embodiment of the invention.
Figure 11:
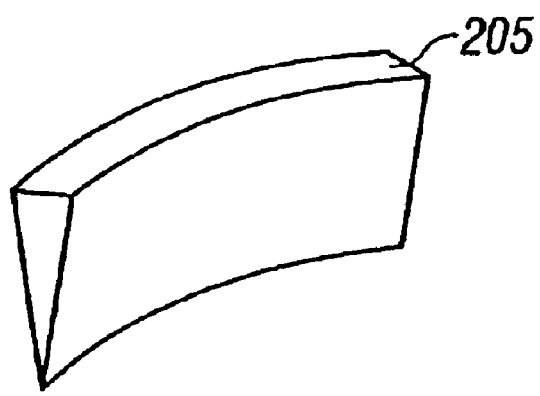
FIG. 11 is a cross-sectional view of a spring used in the suspension of FIG. 10.

It will be appreciated that, should the mirror element 14 be mounted within a suspension, FIGS. 1, 4, 6, and 8 do not illustrate the wafer in which the suspension is mounted. Similarly, FIG. 8 does not illustrate the wafer and suspension for the pivotably mounted substrate 15. Referring now to FIG. 10, in one embodiment the mirror element 14 is formed from a planar silicon wafer 200 polished on both sides to achieve good parallelism. The thickness of the wafer affects the surface flatness of reflecting surface 46 of the mirror element 14 because a metallic coating is deposited on it. The mirror element 14 is mounted within wafer 200 by a suspension formed by hemispherical springs 205. Springs 205 may be formed using photolithography and etched using STS, which is a deep reactive ion etching (RIE) technology. Because the exact spring constant is of little importance using the snap-down (fully deflected) actuation of the invention, the springs 205 may be made relatively thin. FIG. 11 shows a cross-section view of a spring 205. To reduce the spring stiffness, spring 205 is undercut using STS etching. It will be appreciated that the parameters of the STS etching may be modified to achieve myriad cross-sections for spring 205. In embodiments of the inventions wherein the mirror element is preloaded, such preloading may be achieved by mounting the mirror element onto the platform such that the wafer 200 (onto which the mirror element is attached via the springs 205) contacts the baseplate while the element is supported above the platform by the pillar. The total mechanical preload in such an embodiment is equal to the height of the platform and the height of the pillar. It will be appreciated that the pillar 30 may be an element of the suspension by constructing the pillar from a material having a suitable bending stiffness.

The baseplate 15 (illustrated in FIGS. 1, 4, 6, and 8) may be formed using two silicon wafers that are processed, bonded together, and then processed again. For an embodiment in which the pillar 30 is integral with the substrate 15, they may be formed as follows. One wafer may be a SOI wafer composed of a thick substrate layer, a thin oxide epilayer, and a thin heavily doped silicon epilayer covering the oxide epilayer. This wafer would be polished on both sides. The silicon epilayer is patterned with the desired electrode pattern and a thin oxide layer deposited over it. The patterned wafer is then bonded to a second silicon wafer polished on both sides. The second wafer is then patterned to form the pillar 30. A shadow-mask evaporation is finally used to contact the silicon electrodes. The wafer 200 and the substrate 15 may then be aligned and bonded together. It will be appreciated that MEMS technology provides many other processes that may be used to form the pivoting mirror of the present invention.

Thus, the above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention.

We claim:

1. A method, comprising:

providing:

a baseplate forming a first platform, wherein the perimeter of the first platform forms a polygon having a plurality of linear segments, wherein the plurality is of at least six;

an element pivotably mounted on the first platform; and a plurality of electrodes arranged on a surface of the first platform facing the element, the plurality of electrodes being arranged according to the plurality of linear segments such that when a given electrode is energized, the element will deflect onto the perimeter's linear segment corresponding to the given electrode;

energizing a given electrode such that the element deflects onto the perimeter's linear segment corresponding to the given electrode; and next, grounding the given electrode and energizing an electrode immediately adjacent the given electrode such that the element deflects onto the perimeter's linear segment corresponding to the electrode immediately adjacent the given electrode.

2. A method, comprising:

providing:

a baseplate;

an element pivotably mounted on the baseplate, wherein the perimeter of the element forms a plurality of linear segments; and a plurality of electrodes arranged on a surface of the baseplate facing the element, the plurality of electrodes being arranged according to the plurality of linear segments such that when a given electrode is energized, the element will deflect onto the baseplate along the linear segment corresponding to the given electrode;

energizing a given electrode such that the element deflects onto the baseplate along the linear segment corresponding to the given electrode;

next, grounding the given electrode and energizing an electrode immediately adjacent the given electrode such that the element deflects onto the baseplate along the linear segment corresponding to the electrode immediately adjacent the given electrode.

* * * * *